No. 843,502.   
PATENTED FEB. 5, 1907.
W. & A. G. THOMSON.  
EYEPIECE FOR OPTICAL INSTRUMENTS.  
APPLICATION FILED MAR. 6, 1906.
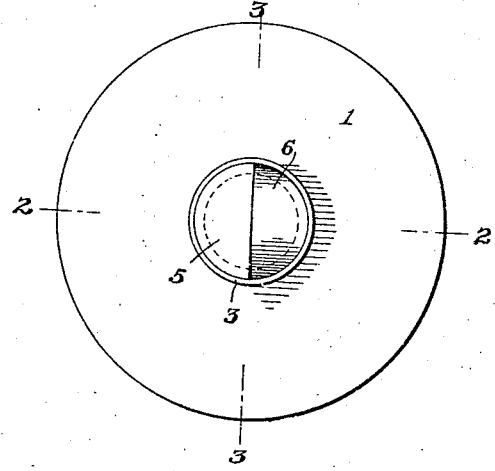
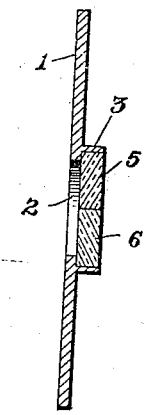
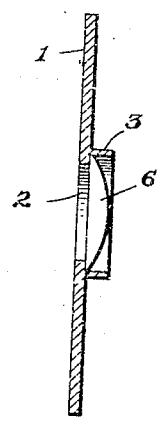
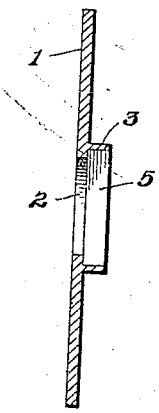
WITNESSES:  
Cyrus N. Anderson  
D. Webster, Jr.
INVENTORS  
William Thomson and  
Archibald G. Thomson  
BY _____  
Attorney

UNITED STATES PATENT OFFICE.

WILLIAM THOMSON AND ARCHIBALD G. THOMSON, OF PHILADELPHIA, PENNSYLVANIA, ASSIGNORS TO FOX OPTICAL MANUFACTURING COMPANY, OF PHILADELPHIA, PENNSYLVANIA, A CORPORATION OF NEW JERSEY.

EYEPIECE FOR OPTICAL INSTRUMENTS.

No. 843,502.     Specification of Letters Patent.     Patented Feb. 5, 1907.

Application filed March 6, 1906. Serial No. 304,519.

*To all whom it may concern:*

Be it known that we, WILLIAM THOMSON and ARCHIBALD G. THOMSON, citizens of the United States, residing in the city and county of Philadelphia, State of Pennsylvania, have invented a certain new and useful improvement in eye pieces for optical instruments, of which the following is a specification.

Our invention relates to an improvement in eye pieces for optical instruments, and it is designed to be used in connection with refracting lenses, whether such lenses be mounted in an instrument such as an optometer or refractometer, or whether the lenses be supported in any other manner.

The object of our invention is to produce a device by the use of which the defect or defects in the refraction of an eye may be ascertained without the use of certain drugs, known as mydriatics, which are used to paralyze the ciliary muscle or accommodative power of the eye.

This result is effected by the employment of means which divides the light which enters an eye, which may be under examination, from a small luminous spot of light into two parts or elements and which also acts upon the light so as to reduce its intensity to such an extent that when striking or falling upon the retina, it does not cause an excitation of the ciliary muscle. The presence of a defect in the refraction of an eye having been ascertained, the amount or extent of such defect may be measured by means of lenses which may be supported in any desirable manner.

Our invention resides in the combination and arrangements of parts as hereinafter set forth in detail, specifically pointed out in the claims, and as illustrated in the accompanying drawings, in which, Figure 1 is a plan view of our invention;

Figure 2 is a section on the line 2-2 of Figure 1;

Figure 3 is a section on the line 3-3 of Figure 1, looking to the right; and

Figure 4 is a section on the line 3-3 of Figure 1, looking to the left.

In the drawings,—

1 designates a plate provided with a central opening 2; 3 designates a holder which surrounds the opening 2 and which is secured to the plate 1 in any suitable manner. The internal diameter of the holder 3 is greater than the diameter of the opening 2, so that a narrow portion of the material of the plate 1 surrounding the opening 2 is included within the holder 3.

The plate 1, opening 2, and holder 3 are illustrated in the drawings as being circular, but they need not necessarily be of this shape or contour.

The essential feature of our invention resides in the association of means with a cylinder of glass of high curvature by the employment of which, as heretofore pointed out, the defect in the refraction of an eye (if such defect exists) may be ascertained.

In the drawings, I have illustrated a semi-circular portion of ruby or other colored glass 5 as being associated with a semi-circular portion of a cylinder of white glass 6 having a high curvature. These portions of glass are located within the holder 3 and rest upon the portion of the material of plate 1 which is included within the said holder. It may be stated here that the holder 3 is employed merely as a protection for the portions of glass 5 and 6, and, if desired, such holder may be omitted or another form of holder may be substituted. The portions of glass 5 and 6 may be secured to the plate 1 in line with the opening 2 therethrough in any desired manner. The colored portion of glass 5 consists of a plate, the opposite sides or surfaces of which are parallel.

In the construction illustrated by us, the portion of glass 6 consists of a semi-circular portion or section of the segment of a cylinder or rod of white glass, and in the particular embodiment of our invention, as illustrated in the drawings, each of the pieces of glass 5 and 6 has one straight edge and in the completed devices these edges are arranged side by side and in contact.

Our invention is to be regarded, however, as including within its scope any means associated with a cylinder of glass of high curvature by means of which the presence of defects in the refraction of the eyes of a person may be ascertained and we do not desire or intend to limit ourselves to the details of construction illustrated.

By reason of the fact that the portion of glass 5 is colored and its opposite faces or surfaces are parallel, and by reason of the fact that the portion of glass 6 is curved upon one side and in one direction only, it will be understood that a light, as for instance a small light of a candle, examined through the device will be divided into two parts, namely, a small spot of light having the same color as that of the colored piece of glass 5 and a line of light occasioned by the curved piece of glass 6. The relative positions of these two portions of light with respect to each other as examined by an observer depend upon the condition of the eye of the observer.

In an emmetropic eye, the spot of colored light will be found to be bisected by the line of white light. However, if the refraction of the eye of the observer is imperfect, the spot of colored light will be to one side or the other of the line of white light, depending upon the nature of the defect in the eye. In a myopic eye, the spot is seen to the same side of the line as the red glass is to the cylinder when placed before the eye, while in hyperopia, the red spot is seen to the other side of the white line.

When either of these or similar conditions are noted, the line of white light and the spot of colored light will be brought into coincidence by interposing a lens or lenses at certain points between the eye piece and the spot of light which is being observed. The positions to which such lenses must be moved vary according to the eye of the person looking at the light through the eye piece.

By the use of these lenses to bring the spot of colored light and the line of white light into coincidence, we are enabled to measure the refraction of an eye, after which the proper glasses may be prescribed for the person whose eyes have been examined, in order to correct the defect or defects of vision.

Having thus described our invention, we claim—

1. A device of the character described, comprising a plurality of pieces of glass arranged near enough together to be simultaneously within the field of vision of an eye, one of which pieces of glass is colored, and the other of which is a section or portion of a segment of a cylinder or rod of white glass.

2. An eye piece for optical instruments, comprising a plurality of pieces of glass, one of which pieces of glass has its opposite surfaces arranged in parallel relation to each other, and the other one of which is plane upon one side and the other side of which is curved in one direction only, the said pieces of glass being arranged out of alinement so as to permit light to enter the eye through either of the said pieces of glass without passing through the other of said pieces.

3. A device of the character described, comprising a plurality of pieces of glass arranged side by side and in contact with each other, one of which is colored, and the opposite surfaces of which are plane, and the other one of which is a section or portion of a segment of a cylinder or rod of white glass.

4. A device of the character described, comprising a plurality of semi-circular pieces of glass having straight edges which are arranged in contact, one of the said pieces of glass being colored and having its opposite surfaces parallel, and the other of said pieces of glass being a section or portion of a segment of a cylinder of white glass.

5. In an eye piece for optical instruments, in combination, a plate having a central opening therein, and a plurality of semi-circular pieces of glass secured to the said plate in line with the said opening, one of the said glasses being colored and having its opposite surfaces parallel, and the other of said glasses being plano-convex in one direction, each of the said pieces of glass having a straight edge, which edges are arranged in parallel relation to each other.

6. In a device of the character described, the combination of a cylinder of glass and means associated therewith for permitting light to enter the eye without passing through the cylinder, whereby the presence of defects of refraction of an eye may be ascertained.

In testimony that we claim the foregoing as our invention, we have hereunto signed our names this 28th day of February, A. D. 1906.

WM. THOMSON.
ARCHIBALD G. THOMSON.

In presence of—
LEWIS JENKINS,
HARRY F. AMBLER.